Aug. 20, 1946.  G. B. GALLASCH  2,406,213
DUST SHIELD
Filed Feb. 26, 1944

GEORGE B. GALLASCH
INVENTOR
BY
ATTORNEYS

Patented Aug. 20, 1946

2,406,213

UNITED STATES PATENT OFFICE 2,406,213

DUST SHIELD

George B. Gallasch, Rochester, N. Y., assignor to Bausch & Lomb Optical Company, Rochester, N. Y., a corporation of New York Application February 26 1944, Serial No. 524,030

2 Claims. (Cl. 88—33)

This invention relates to optical instruments and more particularly to a dust shield for microscopes, telescopes, and the like.

In the use of microscopes, it is common practice to employ several eyepieces for securing different magnifications of the image of the object and, for this purpose, the eyepieces can be interchangeably mounted in the eyepiece tubes secured to the body of the microscope. In prismatic microscopes, the end of each tube is generally mounted in the body of the microscope in spaced relation to the exit face of one of the prisms of the prism system. Upon removal and replacement of the eyepieces, dust in the air surrounding the exterior end of the eyepiece tube enters the tube and lodges on the prisms and objective.

This dust is a source of annoyance to the microscopist for the dust casts shadows in the image field and reduces illumination of the image when lodged on the transmitting faces of the prisms and lenses. Oil particles are particularly objectionable if they adhere to the reflecting faces of the prisms for such particles often distort the image due to the differences in the indices of refraction of the oil and the glass of the prism.

To remove the dust, the microscope must be taken apart and the dust brushed from the prisms and objective. In most cases, the disassembling and reassembling of the microscope requires a factory operation for the exactitude with which the optical elements must be necessarily held in the optical axis of the instrument requires a skilled workman to perform this operation or else the optical elements may be moved out of their optical alignment and the utility of the instrument be materially impaired. Whether or not this operation be performed by a skilled workman or the microscopist, the elimination of the dust from the instrument is a tedious and painstaking task due to the tendency of the dust to settle back on the cleaned surfaces of the optical elements of the microscope.

It is the principal object of the present invention to provide in a microscope or the like, a shield which effectively prevents the entrance of dust into the body of the instrument through the eyepiece tube. To accomplish the result desired, the interior end of the eyepiece tube adjacent the exit face of one of the prisms telescopically receives a tube of such a length that a gasket of rubber, or other resilient material carried by the end face thereof engages the exit face of the prism. As the gasket is held tightly against the face of the prism by the frictional engagement of the telescoping tubes, any dust entering the eyepiece tube will be confined to the area of the face encompassed by the gasket and will thus be prevented from passing into the body of the instrument. The dust will thus be localized in a relatively small space on the face of the prism and may be readily removed through the eyepiece tube.

These and other objects and advantages reside in certain novel features of construction, arrangement, and combination of parts as will hereinafter be more fully set forth and pointed out as the specification proceeds.

Figure 1:
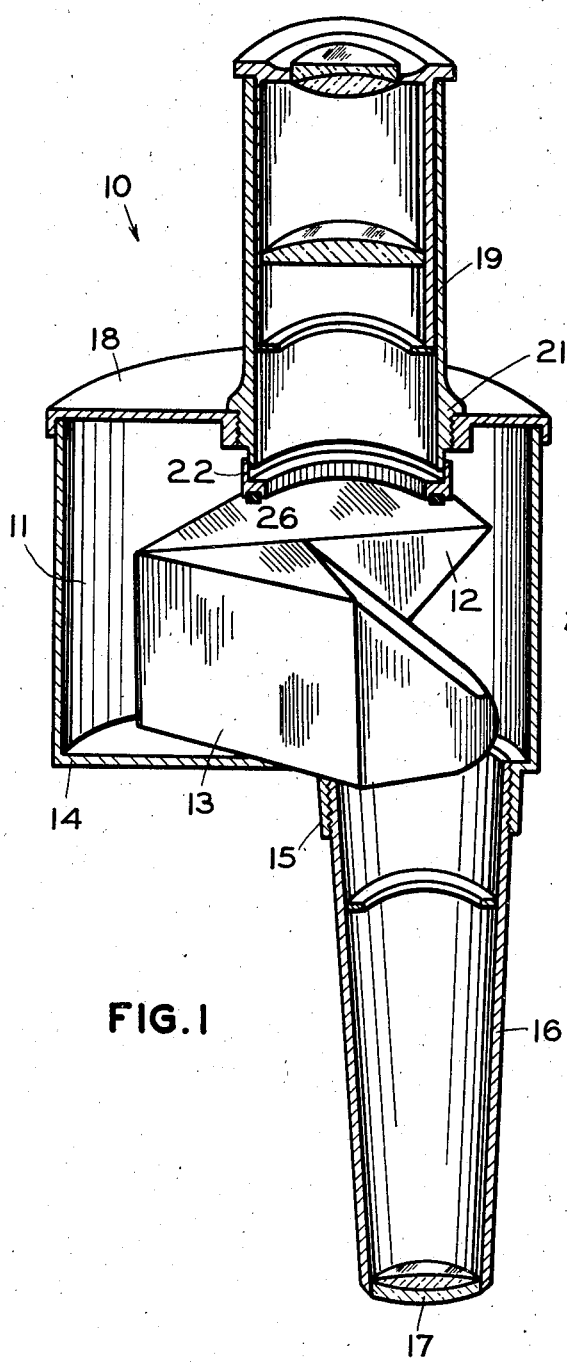
Fig. 1 is a perspective view of a vertical section of one body unit of a binocular microscope having a dust shield embodying my invention.
Figure 2:
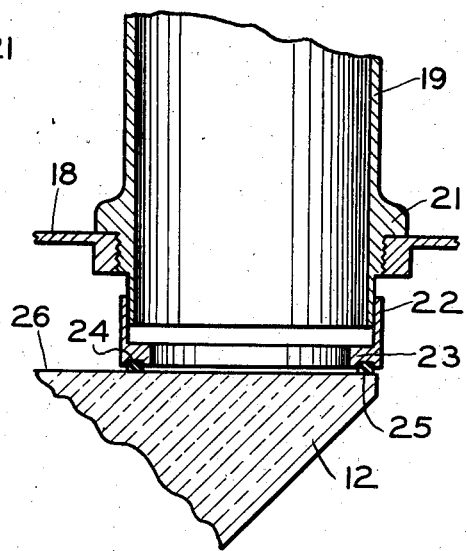
Fig. 2 is a fragmentary sectional view showing the dust shield carried by the lower end of the eyepiece tube and engaging the upper portion of the prism.

Referring to the drawing, it will be seen that the invention is there shown, for the purposes of illustration only, as being embodied in a body unit of a binocular microscope of the Greenough type, designated generally at 10. It will be seen that generally speaking, the microscope comprises a casing or housing 11 in which is mounted a prismatic reversing system comprising a pair of prisms 12 and 13. The bottom wall 14 of the casing is formed with a downwardly extending annular flange 15 into which is threaded the objective tube 16 carrying an objective 17. The other end of the casing 11 is closed by a cap 18 having a threaded opening receiving one end of an eyepiece tube 19. The eyepiece tube is securely held in the cap 18 by threading the tube into the opening in the cap until the flange 21 of the tube is firmly seated upon the edge surface defining the opening in the cap.

In prismatic instruments, such as binocular microscopes of the type shown, the prism assembly is often carried within a casing such as shown at 11 in spaced relation to the eyepiece tube. In the interchange of eyepieces to effect different magnifications of the object and also in the use of the microscope, dust and oil particles frequently enter the eyepiece tube and pass therethrough into the casing to lodge on the prism transmitting and reflecting faces and also on the back surface of the objective. Dust on the transmitting faces casts shadows in the image field and reduces illumination of the image while oil particles often adhere to the reflecting faces of the prism causing distortion of the image due to the variation in the indices of refraction of the oil and the glass of the prism.

The dust shield of the present invention effectively prevents the passage of dust into the casing through the eyepiece tube and thereby insures maximum illumination and the true form of the image. To this end, the dust shield comprises a tubular member 22 telescopically engaging the extremity of the eyepiece tube 19. The end of the member 22 adjacent the prism 12 is formed with a flange 23 underlying the end of the eyepiece tube 19. The bottom surface of the flange 23 is formed with a circumferential groove 24 adapted to receive an annular gasket 25 of rubber, or like elastic material, which, while firmly seated in the groove, extends outwardly therefrom to engage the transmitting face 26 of the prism 12. The gasket 25 is held tightly against the face 26 of the prism 12 by the frictional engagement of the tubular member 22 with the eyepiece tube 19.

It will be apparent that the gasket 25 circumscribes an annular area on the face 26 of the prism 12 and, by so doing, effectually seals the interior of the casing from dust passing into the eyepiece tube. The dust will thus be localized on the face of the prism within the limits defined by the opening in the gasket and may be readily removed from the face of the prism through the eyepiece tube in any desired manner.

In the assembly of the dust shield with the microscope, the cap is removed and the tubular member 22 slid over the end of the eyepiece tube 19. The cap is then replaced on the casing and then the flange 23 is pushed downwardly by any suitable tool passed into the tube 19 until the gasket is seated upon the face 26 of the prism 12.

As the tubular member 22 telescopically receives the eyepiece tube 19, the dust shield does not interfere with the movement of eyepieces of substantial length in the eyepiece tube. Also, the opening in the flange 23 is of sufficient diameter to prevent vignetting.

From the foregoing, it will be apparent that I am able to attain the objects of my invention and provide a dust shield for optical instruments preventing passage of dust into the casing through the eyepiece tube. While the dust shield has been shown and described with reference to a prismatic microscope, its use should not be limited thereto for the shield may be used in any optical instrument wherein an optical element is mounted closely adjacent the eyepiece tube and can be used to form an element of the seal. For this purpose, various modifications can be made without departing from the spirit of my invention as defined in the appended claims.

I claim:

1. An optical instrument having in combination a casing provided with an aperture, an optical element mounted in the casing, said element having a surface spaced from and in alignment with the aperture, a lens tube mounted in said aperture and having an end projecting into the casing adjacent to but out of contact with said surface, a tubular member telescopically mounted on said end, and gasket means carried by said member and adapted to engage the surface of the element whereby the passage of dust through the tube and into the casing is prevented.

2. An optical instrument comprising a casing having an aperture, an optical element mounted within the casing in alignment with the aperture, a lens tube threadedly mounted on the casing and having an end extending through the aperture and into the casing in proximity to a surface of the element, a tubular member slidably mounted on the outer surface of the end of the tube, said member having an integral flange, gasket means carried on said flange, said member being adjustably positioned on the tube to bring the gasket means into contact with the surface of the element whereby the passage of dust through the tube and into the casing is prevented.

GEORGE B. GALLASCH.